Patented June 8, 1926.                                                      1,588,285

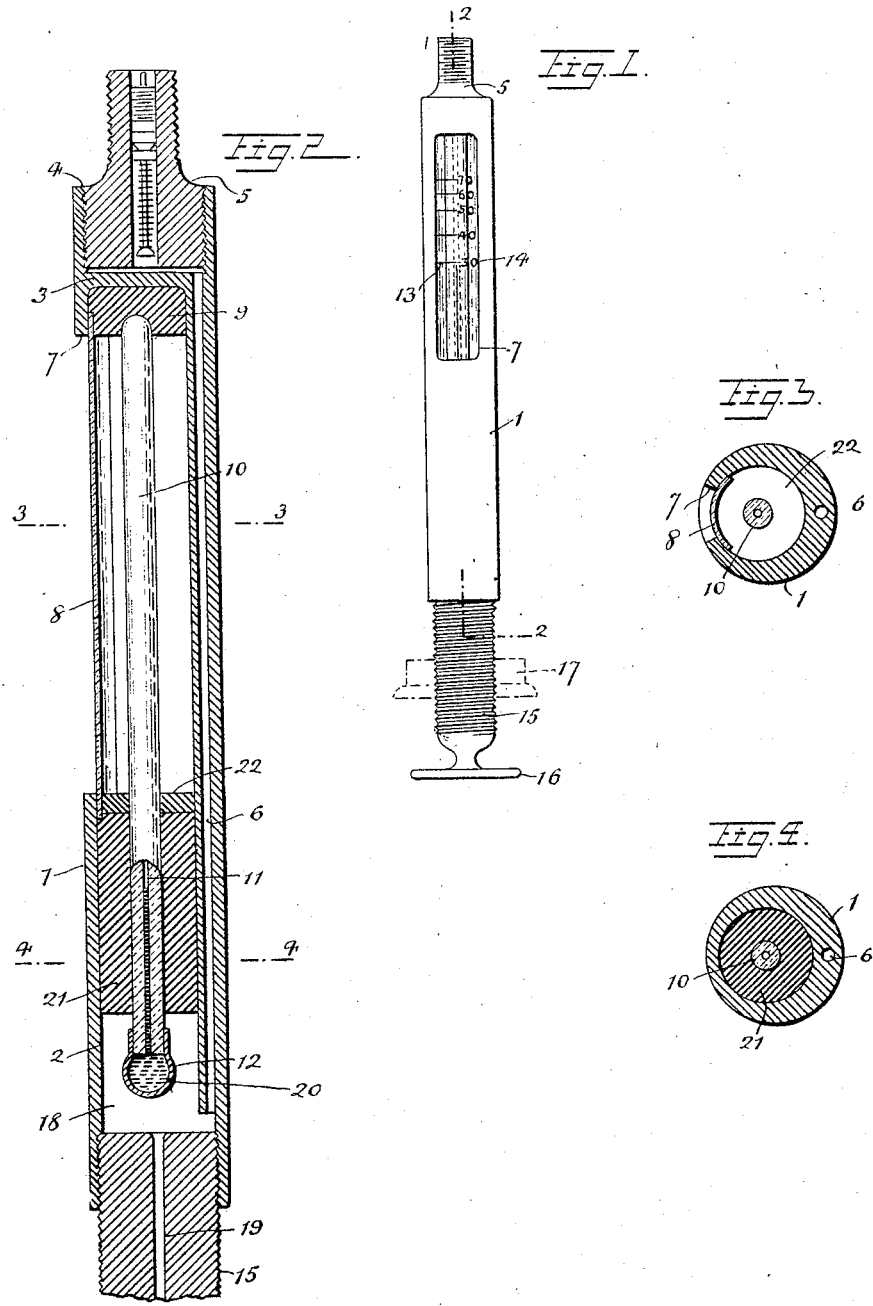

UNITED STATES PATENT OFFICE.

EDWARD G. WEAVER, OF BUTTE, MONTANA.

AIR-PRESSURE GAUGE.

Application filed June 26, 1924. Serial No. 722,530.

This invention relates to a gauge for the valves of air containers, and particularly for a valve stem used in connection with an automobile tire.

An object of the invention is to provide a simple and very effective construction which will continually indicate the pressure in the container or tire to which it is connected.

Another object, more specifically, is to provide a gauge applicable to and forming part of the valve stem of an automobile tire valve, wherein the structure may be used in the usual manner when pumping the tire and will at the same time function as a gauge for indicating constantly the pressure in the tire.

In the accompanying drawing:—

Figure 1 is a side view of a gauge and valve stem embodying the invention.

Figure 2 is a longitudinal vertical sectional view through Figure 1 approximately on line 2—2, the same being on an enlarged scale.

Figure 3 is a transverse sectional view through Figure 2 approximately on line 3—3.

Figure 4 is a transverse sectional view through Figure 2 approximately on line 4—4.

In constructing the gauge, the same may form a tubular body 1 having a large bore 2 extending from the bottom upwardly to the division wall 3, and above this division wall is provided a threaded bore 4 designed to receive the externally screw threaded sleeve 5 which is screwed into the bore 4. The sleeve 5 is adapted to receive the valve mechanism of an ordinary valve. Arranged parallel to the bore 2 is a small bore 6, which may be of any desired size, as, for instance, 1/64 of an inch in diameter. This small bore opens into bore 4 and to the open part of bore 2. The body 1 is cut away at 7 for providing a window, which window is in turn provided with a covering 8 of glass or celluloid or other transparent material. A rubber cushion member 9 is provided at the top of bore 2, which acts to hold the window pane 8 in place and also to receive and hold the gauge tube 10 in place. This tube is provided with a very small bore 11 extending from the bottom to near the top. At the bottom it opens into a collapsible member 12, which may be of rubber or any desired material. A quantity of liquid is arranged in the collapsible member 12, said liquid extending upwardly a short distance into the bore 11. This liquid may be any suitable liquid but preferably colored glycerine. The pane of celluloid or glass 8 is provided with a number of graduations 13, on which may be provided legends 14 if desired in order to indicate directly the pressure. The body 1 is internally threaded at the lower end so as to be screwed on to the usual threaded tire clamp 15, which is formed with the usual enlarged foot 16 and provided with the usual clamping nut and washer 17, and the member 15 is preferably of the old well known type now in common use, and the lower end of the body 1 is made to fit thereon and screw into place, as indicated in Figures 1 and 2. The pump or other air supply member is applied to the upper end of the sleeve 5, and as the air is forced in it will pass downwardly through the passageway 6 into the lower part of chamber 18, the bore 2, and from thence through the passageway 19 into the tire or other air container to be supplied with air. As the pressure in the tire increases, there will be a corresponding increase of pressure in the chamber 18, and as this pressure increases the collapsible member 12 will gradually force the liquid 20 upwardly in bore 11 against the air confined therein. The confining of air in this passageway is desirable, in that it will force the liquid 20 back in proportion to the decrease of pressure in chamber 18 if there is a leakage or removal of the air for any cause. It will thus be seen that the column of liquid moves upwardly in the bore 11 in accordance with Bolye's law and, consequently, the graduations 13 may be accurately positioned so as to be readily read at any time. The body 1 and associated parts forming the gauge is left in place continually, whereby anyone can readily see at any time the amount of air in a given tire without applying a test gauge from time to time. In Figure 2, it will be noted that the lower part of the gauge tube 10, which tube is made of glass, is held properly centered by a filling 21 of rubber, which is preferably secured in place by suitable cement and also secured to the tube 10 by cement. A washer 22 is arranged on top of the filling 21, said washer being of any desired material, as, for instance, metal or rubber. This washer acts to prevent any outward movement or extrusion of the filling 21 and also acts to retain the lower part of the pane 8 in place. If this washer is made from rubber it is firmly cemented in place, whereas if it is made from metal it is welded, abrazed or otherwise rigidly secured to body 1 and will thereby effectively resist any upward movement of the filling 21 by reason of the pressure in chamber 18.

The gauge tube 10 has been described as made of glass but it will be understood that the same may be made from celluloid or any other suitable transparent material which will withstand the pressure and also permit the liquid 20 to be seen.

I claim:—

A gauge for measuring fluid pressure, comprising a tubular member having an opening at one end, a collapsible container connected with said tubular member and in free communication with the interior thereof in said opening, a casing for said tubular member and container, said casing being provided with a window, a cushioning member engaging the upper part of the casing and the upper part of the tubular member for holding the same opposite said window, a supporting and cushioning member engaging part of the tubular member near said container for centering and holding in operative position the lower part of the tubular member so that the tubular member may be properly seen through said window, a liquid within said container adapted to be moved into said tubular member in proportion to the collapsed condition of the container, said container being disposed in the fluid, the pressure of which is to be measured, and means forming part of the casing for directing fluid to a point near said container.

EDWARD G. WEAVER.